United States Patent Office 2,863,573
Patented Dec. 9, 1958

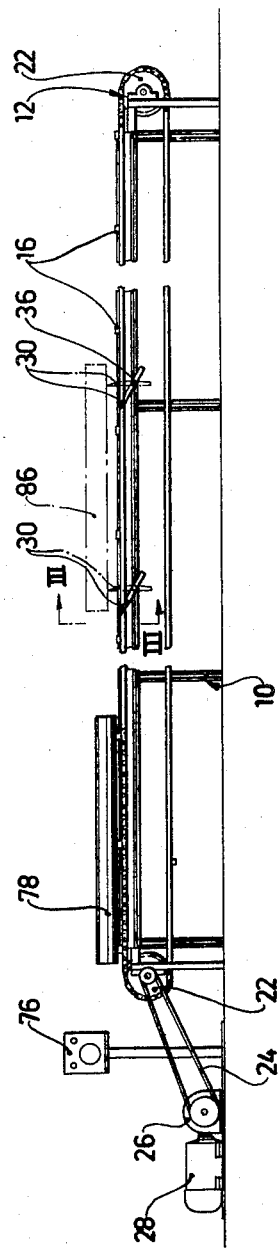

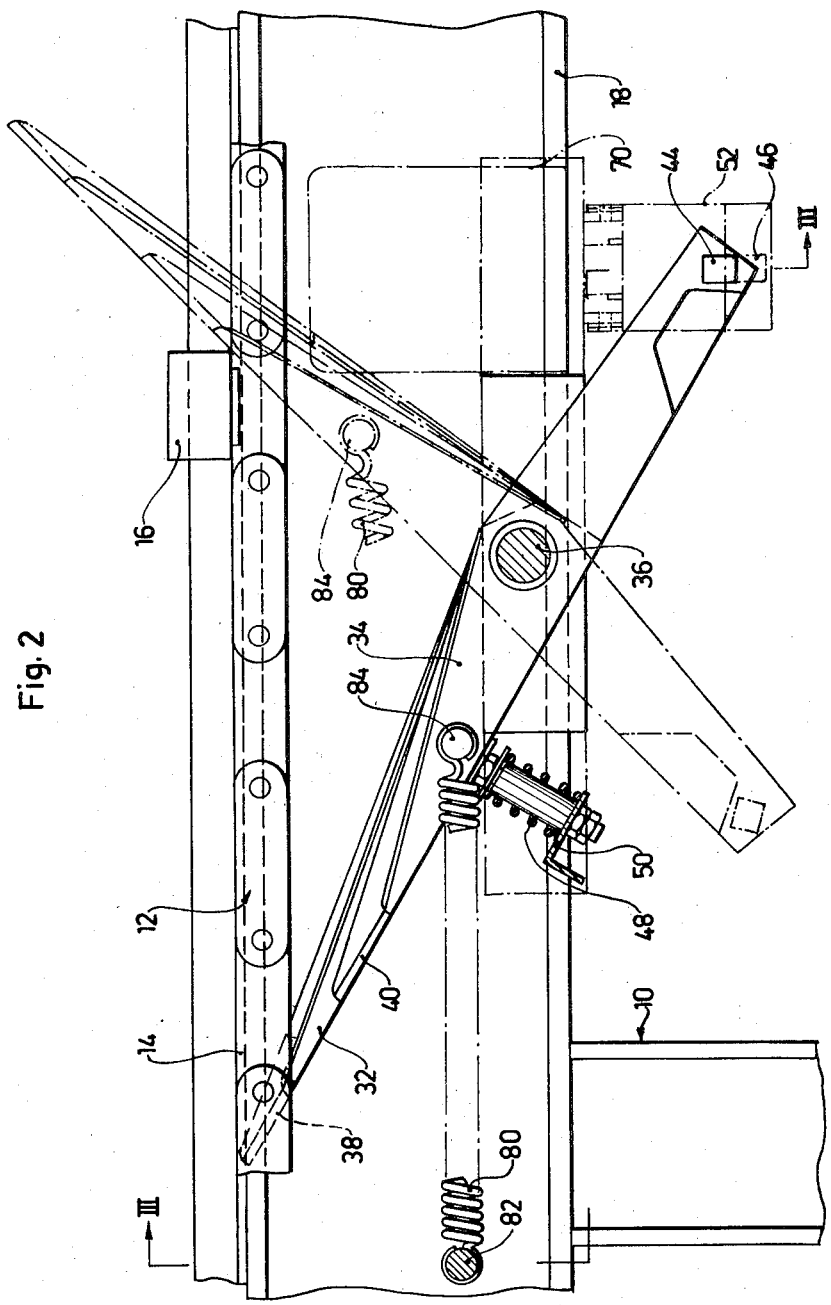

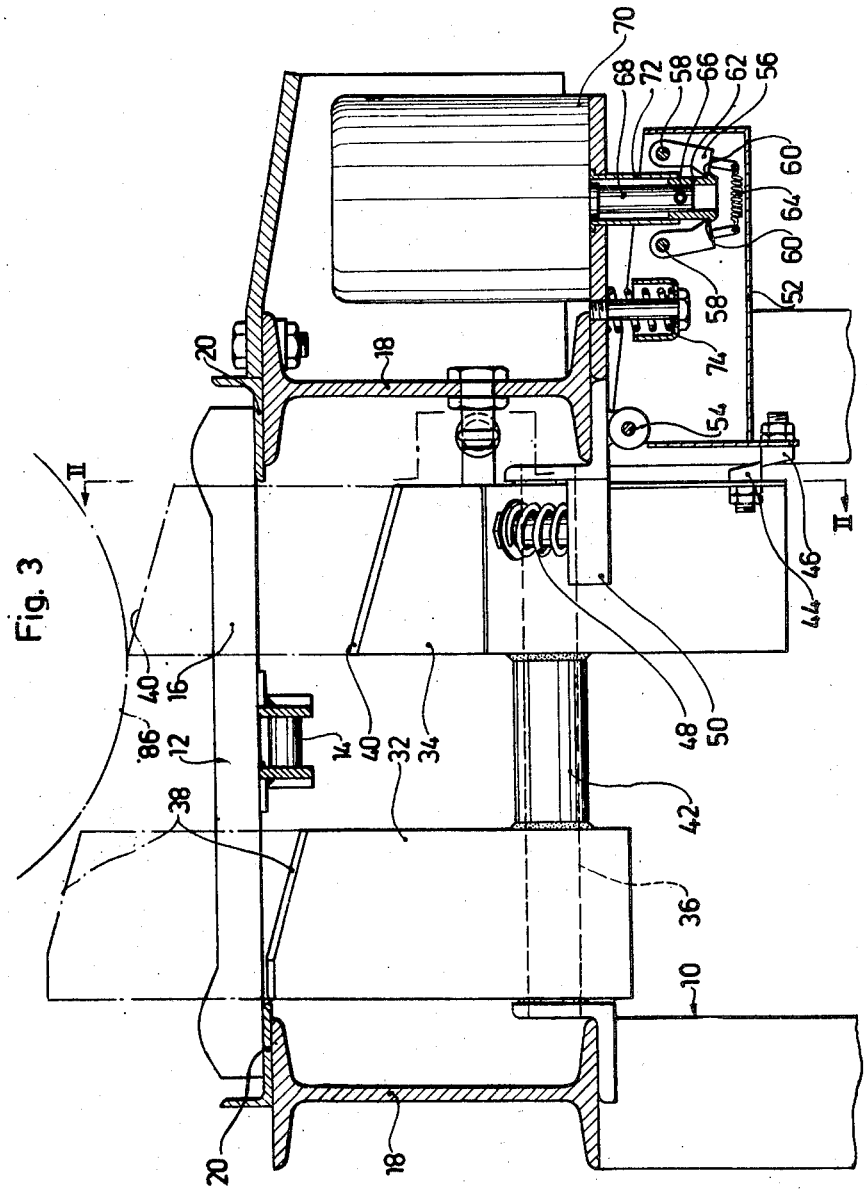

2,863,573

SIZING PLANT FOR LUMBER

Arne Alvar von Sneidern, Johanneshov, Sweden

Application October 17, 1955, Serial No. 541,001

Claims priority, application Sweden October 19, 1954

6 Claims. (Cl. 214—11)

This invention relates to a sizing plant for lumber comprising an endless, positively driven conveying belt supported on a frame. The sizing of the lumber trunks is effected according to their thickness, a sorting according to various species of wood being also desired in some cases. The trunks are nowadays sized in orders of magnitude determined by half inches which involves that the conveying belt along which the sized trunks are discharged at different places may attain a large longitudinal dimension.

One main object of the invention is to provide a sizing plant of the aforesaid type rendering possible to control the discharge of the sized trunks at predetermined places from a central control device which preferably is located at that end of the belt where the trunks after performed measuring are fed on said belt.

A further object of the invention is to provide a sizing plant of the aforesaid type which is of relatively simple construction and easy operation and which performs the discharge of the trunks at predetermined places in a highly reliable manner.

According to one feature of the invention members corresponding to the number of discharge places are disposed in spaced relation along the belt and adapted upon actuation from an impulse giving device to be released and thereupon to discharge the trunks at the predetermined place alongside the frame with the aid of the force produced by the advance movement of the belt.

Further objects and advantages of the invention will be apparent from the following description considered in connection with the accompanying drawings, which form part of this specification, and of which:

Fig. 1 is a diagrammatic side elevation of a sizing plant constructed according to the invention.

Fig. 2 is a side view on an enlarged scale of a part of the sizing plant viewed following line II—II of Fig. 3 which in turn is a sectional view following line III—III of Fig. 1 and the broken line III—III of Fig. 2, respectively.

Referring to the drawings, 10 generally denotes a frame and 12 an endless conveying belt supported by said frame. Said belt may have a length of 200 meters or more depending on the number of size measure units according to which the sizing is to be effected. Disposed alongside said belt and possibly on both sides thereof are sections the length of which corresponds to that of the individual trunks and which are intended to receive trunks of the same kind, primarily having the same thickness but possibly also constituted by the same species of wood. The belt 12 may comprise a chain 14 and conveyers 16 disposed on the outer surface thereof, the middle portions of which are secured to the links of said chain and the ends of which slide along lateral guides 20 carried by beams 18. At the ends of the belt the chain passes around wheels 22, one of which is driven by an electric motor 28 through a belt transmission 24 and a gear 26.

Disposed in front of each sizing section is a discharge device constructed according to the invention. Said device comprises two pairs of tilting arms 30, Fig. 1, disposed in spaced relation relative one another over a distance minor than the length of the individual trunks. Each pair of arms denoted by 32 and 34, respectively, in Figs. 2 and 3, is pivotable on a common shaft 36 situated below the upper part of the belt 12. Said arms are further positioned on either side of the chain 14 and extend between said chain and the lateral guides 20. The upper short edges 38, 40 of said arms are chamfered, and since the shanks of the arms have various length above the shaft 36, said edges will approximately follow a coherent inclined line. The two arms 32, 34 are rigidly interconnected by a sleeve member 42 pushed on the arm 36.

The tilting arms 30 when inactive are kept tilted down in the position below the conveyers 16 indicated in the figures by full lines. A locking knob 44 provided on the arm 34 bears against a locking knob 46 preventing the tilting arms from turning upwardly. A spring 48 bears against a fix support 50 and the upper shank of the arm 34 and exercises a pressure on said shank.

The locking knob 46 is secured to a movable beam 52 disposed pivotable on a journal 54. Two locking arms 56 forming part of said movable beam are pivoted on pins 58. Said arms 56 have hook-shaped projections 60 which by a spring 64 exercising a radial pressure are kept abutting against a shoulder formed on a sleeve 62. The sleeve 62 is connected by means of a pin 66 with a tap 68 on a locking member 70 adapted to be actuated by electricity. When said locking member receives an impulse, the tap 68 is drawn upwardly and thereunder carries the movable beam 52 with it causing said beam to turn upon the shaft 54 and thereby to disengage the knob 46 from the knob 44. Disposed around the sleeve 62 and the tap 68 is a stationary sleeve 72 which when the movable beam is attaining its upper end position abuts against the locking arms 56 and forces them to displace themselves outwardly so as to cause their projections 60 to slide off from the shoulder of the sleeve 62. Thereupon the movable beam is immediately conveyed downwards into its initial position by the spring 74.

The trunks are placed on the conveying belt 12 at the left end thereof viewed in the plane of Fig. 1. There the trunks are sized according to their thickness. Positioned close by the operator is an impulse giving instrument 76 synchronized with the advance speed of the belt and provided with a system of contact members connected to the various locking members. Assumed that a trunk has the dimension of 6 inches, for example, the operator adjusts the instrument for said dimension which implies that the locking members 70 for the pairs of tilting arms 30 are caused to become active when the trunk 78 has arrived in front of the corresponding section. The impulse giving instrument may be of known construction operating according to the program initiated by the operator and it shall not be described more detailed in the present connection.

The knob 46 having been released, the spring 48 turns the pair of tilting arms 32, 34 upwardly so much as to cause its upper part to attain the same level as that of the conveyers 16. Said movement is effected against the pressure exerted by a longer spring 80 attached to the frame 82 and pivotably on a journal and to the pair of tiltable arms on a journal 84. Said spring 80 may be approximately released when it is in its initial position and further it may be positioned so that the spring 48 then is stronger. When the nearest conveyer 16 has been advanced into contact with the pair of tilting arms said pair is forced to turn with its upper part upwardly while tensioning the spring 80. At the same time said pairs of arms lift the trunk from the conveyers 16, as is indicated in the Figs. 1 and 3 by the dash-and-dotted lines 86.

Due to the chamfered edges 38 and 40 the trunk is caused to roll laterally outwardly into its predetermined section. The arms are turned continuously in the same upward direction until the conveyer 16 has been advanced so much as to lose its contact with said arms. Then the tensioned spring 80 becomes active and immediately returns the tilting arms into their initial position, the spring 48 being compressed and the locking knobs 44, 46 locking the arms in their initial position. Said returning movement is thus performed before the next following conveyer has been advanced so much as to come into contact with said arms.

Since the time elapsing for release of the locking members can be longer than the time required for performance of the movement of the tilting arms it is important that the locking knob 46 is in its locking position at the correct moment which is ensured by the high-speed releasing mechanism 56, 62, 72 described above.

The same portion of the frame may be provided with two discharge devices of which one operates for discharge of trunks to one side of the belt and the other for discharge to the opposite side. Said devices may be constructed alike but with the difference that the upper edges of the tiltable arms are chamfered in opposite directions. The invention may also be used for sizing or sorting of boards and other wood products according to various sizes or species of wood.

While one more or less specific embodiment of the invention has been shown, it is to be understood that this is for purpose of illustration only, and the invention is not to be limited thereby, but its scope is to be determined by the appended claims.

What I claim is:

1. In a sizing plant for lumber comprising an endless, positively driven conveying belt supported on a frame, from which belt trunks of the same kind are discharged at the same of a number of spaced places along the longitudinal direction of the frame, members corresponding to the number of discharge places being disposed in spaced relation along said belt and adapted upon actuation from an impulse giving device to be moved and thereupon to discharge the individual trunks at the predetermined place alongside the frame with the aid of the force producing the advance movement of said belt, said members comprising tilting arms adapted normally to be kept clear of the upper path of said belt but upon release to be turned upwardly into a position where they are caught to follow the advancing belt while continuing their turning movement.

2. In a sizing device as claimed in claim 1, said tilting arms being disposed in pairs at each discharge place.

3. In a sizing device as claimed in claim 1, said tilting arms being disposed in pairs on a shaft extending transversally to the direction of movement of the belt and axially spaced from one another over a distance minor than the thickness of the individual trunks.

4. In a sizing device as claimed in claim 3, said two tiltable arms having a chamfered edge face adapted to constitute a support for the trunk during the lifting movement thereof.

5. In a sizing device as claimed in claim 3 the conveying belt of which comprises a centrally disposed chain-formed member and transversally extending pin-shaped conveyers secured to said chain, said two tilting arms being provided on either side of said chain.

6. In a sizing device as claimed in claim 4, the conveying belt of which comprises a centrally disposed chain-formed member and transversally extending pin-shaped conveyers secured to said chain, said two tilting arms being provided on either side of said chain.

References Cited in the file of this patent

UNITED STATES PATENTS

| | | |
|---|---|---|
| 2,053,328 | Elliott | Sept. 8, 1936 |
| 2,707,569 | Benson | May 3, 1955 |
| 2,734,643 | MacRae | Feb. 14, 1956 |